Figure 1:
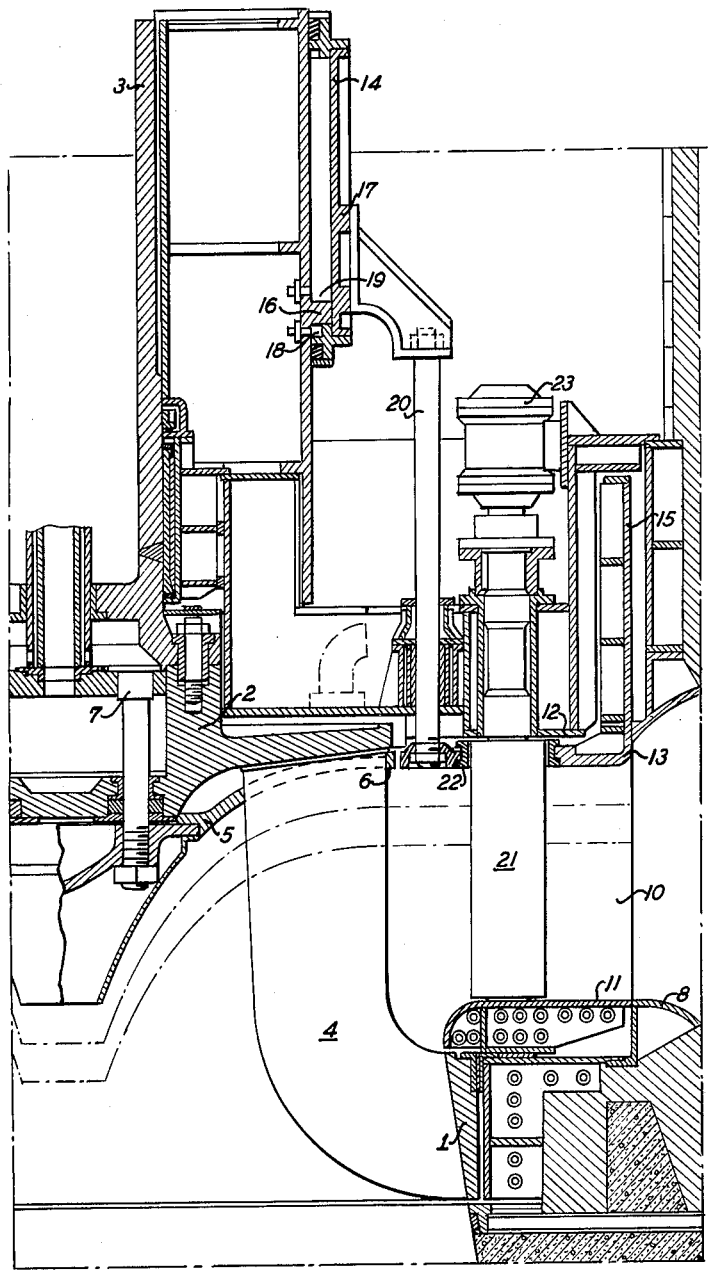

United States Patent Office 3,240,469
Patented Mar. 15, 1966

3,240,469
RADIAL-AXIAL FLOW HYDRAULIC TURBINE OF DOUBLE GOVERNING
Alexandr Matiasovich Gokhman, Moscow, U.S.S.R., assignor to Moscowsky Energetichesky Institute, Moscow, U.S.S.R.
Filed Oct. 14, 1964, Ser. No. 403,950
4 Claims. (Cl. 253—122)

The present invention relates to radial-axial flow turbines, and more particularly, to hydraulic turbines for electric plants operating within the 50–150 m. range of heads.

As it is known, with hydroplants operating within the above said range of heads, two types of hydraulic turbines are employed: Francis radial-axial flow turbines, with single governing and adjustable-blade hydraulic turbines (Kaplan and Deriaz).

The radial-axial flow hydraulic turbines though having a low cavitation factor and high efficiency under optimum loads, are characterized by low efficiency under partial loads and head variations, as well as by significant pulsations in the draft tube.

The adjustable-blade hydraulic turbines with their reduced pulsations in the draft tube and higher efficiency under partial loads and head variations are characterized by a higher cavitation factor.

The said drawbacks can be eliminated in hydraulic turbines with double governing which improves energy properties of the Francis type turbine while its cavitation properties remain preserved.

In known radial-axial flow hydraulic turbines with double governing there were provided a gate apparatus with fixed lower and upper covers containing adjustable vanes, a runner with a fixed hub and blades, and a gear for changing the outlet cross-section of the runner. Double governing of said turbines is accomplished by means of simultaneous change of runner outlet cross-section and guide vanes opening. In this case all the passages from the spiral case to the runner outlet cross-section remain constant.

But such design of the double-governing hydraulic turbine does not improve its energy properties because of great energy losses in the runner caused by sudden contraction in the high velocity zone.

All previous attempts to eliminate the said drawbacks have resulted in failure, I have managed to successfully solve this problem and to carry it into practice.

As it is now stated, such design of the hydraulic turbine which permits to simultaneously change both the height of the guide vanes and of the runner inlet, and guide vane opening, ensures high efficiency of the hydraulic turbine under partial loads and head variations and assists in reducing pulsations while operating on all duties, and providing at the same time preservation of good cavitation properties.

The invention is to be used with hydraulic turbines operating under heads from 50 to 150 m. with unstable load and head variations.

The purpose of the present invention is to increase the efficiency of the hydraulic turbine under partial loads and head variations.

The second purpose of the invention is to reduce pulsations in the draft tube.

Moreover, the hydraulic turbine of the invention can be used reversibly, i.e. alternatively as turbine and as a pump.

Figure 2:
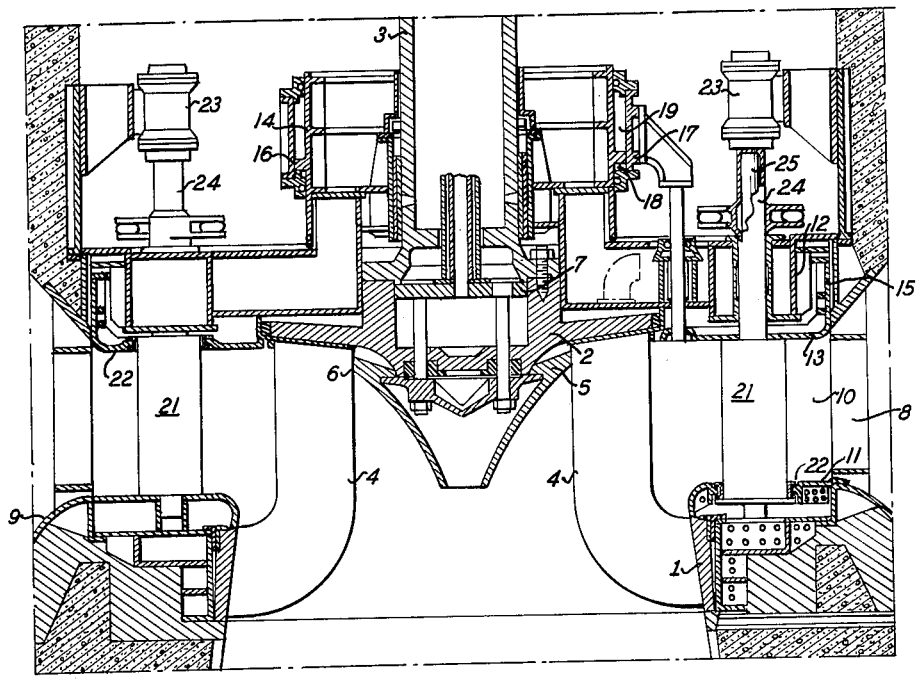

In compliance with said purpose the invention is based on a new combination of components and assemblies of the hydraulic turbine and on design features described below with reference to the appended drawings in which:

FIG. 1 is a sectional view of a radial-axial flow hydraulic turibne of double governing in which the gate apparatus can be locked with a cylindrical shield; and FIG. 2 is a sectional view of the radial-axial flow hydraulic turbine the gate apparatus of which can be locked with vanes.

The hydraulic turbine comprises a runner 1 with a hub 2 fixedly secured on hollow shaft 3. Attached to hub 2 are fixed blades 4 of runner 1, said runner being fitted with an axiallly moving supplementary hub 5 with the blades 4 passing through slots 6 in hub 5. Servomotor 7 moves hub 5.

The hydraulic turbine also comprises stay ring 8, spiral case 9 and gate apparatus 10 with lower (11) and upper (12) fixed covers. The gate apparatus 10 is fitted with a supplementary upper cover 13 which moves in axial direction being driven by servomotor 14.

The outer part of moving cover 13 includes cylindrical shield 15, said shield serving as a closure for gate apparatus 10.

Servomotor 14 is inclusive of piston 16 attached to the upper fixed cover 12 of gate apparatus 10. Located around piston 16 is a cylinder 17, driven by the pressure of oil admitted into chambers 18 and 19, said cylinder being connected to moving cover 13 by means of rods 20.

The guide vanes of the gate apparatus 10 of FIG. 1 include angularly adjustable guide vanes 21. These guide vanes pass through adjustable washers 22 in the upper movable cover 13 and are secured to upper cover 12. Servomotors 23 are secured to guide vanes 21 for rotating the same to cause mutual overlapping of vanes 21 of gate apparatus 12 to entirely close the runner inlet opening. Additional adjustment of the runner inlet opening is obtained by the axial position of cover 13 and shield 15 thereof. Taken together, the shield 15 and vanes 21 provide for variation in the height of the runner inlet opening and for variation in the guide vane openings.

In the arrangement of FIG. 2, some of the guide vanes 21, as illustrated on the right side of FIG. 2, are secured to cover 13 and are received in adjustable washers in the lower cover 11 so as to be axially movable with cover 13. Thereby these vanes will adjust the runner inlet opening in accordance with the axial position of cover 13. The remainder of vanes 21 are mounted as in the arrangement of FIG. 1 as for example, shown on the left in FIG. 2 and are angularly controlled by servomotors 23 to vary the guide vane openings.

The servomotors 23 are mounted on journals 24 of the axially fixed vanes. Journals 25 of the axially adjustable vanes 21 are fitted with sliding keys 26 which permit to turn the said axially adjustable vanes.

In this case cylindrical shield 15 does not operate as a closing device and therefore its height equals the maximum height variations of gate apparatus 10 while governing is achieved.

When closing gate apparatus 10 with the cylindrical shield 15 (FIG. 1) its height must be equal to the maximum height of gate apparatus 10.

Double governing of the claimed hydraulic turbine is carried out by simultaneously changing both the height of the gate apparatus 10 and of the runner (1) inlet, and the guide vane opening.

Operation of the servomotors 7, 14 and 23 which carry out all the changes mentioned above is effected in dependence upon the blade control necessary for the optimum performance of the hydraulic turbine.

The hydraulic turbine may be used reversibly as a pump. In this case its design provides for the maximum efficiency both when it is operated as a turbine and when it is used as a pump. When reversing the hydraulic turbine to a pump, the gate apparatus (FIG. 1) can be used as a recovering device by turning the vanes through 180°.

It should be noted, that the present invention provides for the maximum efficiency of the radial-axial flow hydraulic turbines within a wide range of head variations and load changes.

Many changes and variations in the embodiment described hereinbefore may be accomplished without departing from the scope and spirit of the invention as defined in the appended claims.

What is claimed is:

1. In a radial-axial flow hydraulic turbine with double governing comprising a casing with an opening for the passage of a liquid, a stay ring secured to said casing at said opening, lower and upper stationary covers secured to said stay ring, gate means secured between said covers for adjusting the opening in the casing both as to the height thereof and the area across such height for the guiding of the passage of the liquid in said opening, said gate means comprising a movable upper cover, the said movable cover including a peripheral cylindrical shield adapted as a closure device for blocking the opening in varying amount depending on the position of the movable cover, a runner in said casing and including a non-adjustable hub and non-adjustable blades secured to said hub, the said runner further including a supplementary adjustable hub mounted coaxially with the first said hub and movable along the turbine axis, the said adjustable hub being provided with slots through which pass the blades; said gate means including adjustable washers with slots located in the said movable upper cover; adjustable guide vanes secured in the stationary upper cover of the said gate means and passing through the slots in the said adjustable washers; and a servomotor coupled to the adjustable hub to vary the vertical positon of the said adjustable hub of the runner, the said servomotor being located in the said non-adjustable hub of the runner.

2. In a turbine as claimed in claim 1 comprising a servomotor for the displacement of the said movable cover of the gate means, the latter said servomotor comprising a piston attached to the upper stationary cover of the said gate means, a cylinder enclosing the said piston, and rods connecting the said cylinder with the movable upper cover, said rods being driven by the cylinder upon admission of pressure fluid to said cylinder.

3. In a radial-axial flow hydraulic turbine with double governing comprising a casing with an opening for the passage of a liquid, a stay ring secured to said casing at said opening, lower and upper stationary covers secured to said stay ring, gate means secured between said covers for adjusting the opening in the casing both as to the height thereof and the area across such height for the guiding of the passage of the liquid in said opening, said gate means comprising a movable upper cover, the said movable cover including a peripheral cylindrical shield adapted as a closure device for blocking the opening in varying amount depending on the position of the movable cover, a runner in said casing and including a non-adjustable hub and non-adjustable blades secured to said hub, the said runner further including a supplementary adjustable hub mounted coaxially with the first said hub and movable along the turbine axis, the said adjustable hub being provided with slots through which pass the blades; said gate means including adjustable washers mounted in the lower stationary cover and the upper movable cover, angularly adjustable guide vanes secured to the upper and lower stationary covers and passing through the slots in the washers in the movable cover, said vanes being axially immovable, additional guide vanes secured to the movable cover and movable therewith, said additional guide vanes pasisng through the slots in the washers in the lower stationary cover, a first servomotor coupled to the first said guide vanes to angularly adjust the same to vary the opening between the guide vanes, a second servomotor coupled to said movable cover of the gate means for axially displacing the latter to vary the position of the additional guide vanes and thereby the height of the opening and a third servomotor coupled to the adjustable hub of the runner to vary the vertical position thereof, the latter servomotor being located in the non-adjustable hub of the runner.

4. In a turbine as claimed in claim 3 wherein said second servomotor comprises a piston attached to the upper stationary cover of the said gate means, a cylinder enclosing said piston, and rods connecting the said cylinder with the said movable upper cover, said rods being driven by said cylinder upon admission of pressure fluid to said cylinder, and means for rotating the additional guide vanes comprising journals for said additional guide vanes, a servomotor for rotating said journals and thereby the additional guide vanes and sliding keys in said journals to permit axial displacement thereof.

References Cited by the Examiner

UNITED STATES PATENTS

| 322,764 | 7/1885 | Waddell | 253—121 |
| 1,656,006 | 1/1928 | Lieber | 253—121 |
| 1,872,165 | 8/1932 | Moody | 253—122 |

FOREIGN PATENTS

| 848,330 | 9/1952 | Germany. | |

MARK NEWMAN, Primary Examiner.

JULIUS E. WEST, Examiner.

W. E. BURNS, Assistant Examiner.